Oct. 18, 1960 D. K. SCHAEVE ET AL 2,957,111
CONDITION RESPONSIVE CONTROL APPARATUS
Filed Dec. 11, 1957 6 Sheets-Sheet 1

INVENTOR.
Donald K. Schaeve
and Milton R. Carlson
BY Carlson, Pitzner, Hubbard & Wolfe
ATTORNEYS

TIME

INVENTORS
DONALD K. SCHAEVE
MILTON R. CARLSON
BY
ATTORNEYS

Oct. 18, 1960 D. K. SCHAEVE ET AL 2,957,111
CONDITION RESPONSIVE CONTROL APPARATUS
Filed Dec. 11, 1957 6 Sheets-Sheet 6

INVENTORS
DONALD K. SCHAEVE
MILTON R. CARLSON
BY
ATTORNEYS

United States Patent Office 2,957,111
Patented Oct. 18, 1960

2,957,111

CONDITION RESPONSIVE CONTROL APPARATUS

Donald K. Schaeve and Milton R. Carlson, Rockford, Ill., assignors to Barber-Colman Company, Rockford, Ill., a corporation of Illinois Filed Dec. 11, 1957, Ser. No. 702,027

10 Claims. (Cl. 317—148.5)

This invention relates generally to apparatus which responds to changes in a condition being controlled and automatically activates a condition regulator to maintain the condition at a desired value. More particularly, the invention relates to apparatus, in a temperature control system, for activating a heat regulator in response to a signal derived from a balanced network including a negative temperature coefficient sensing element whose resistance varies inversely with changes of the temperature of the controlled medium. In such a system, the signal derived from the network upon interruption of the circuit through the sensing element is of the same type as that for a temperature below the desired value and thus provides a false indication of a need for heat.

The primary object of the invention is to provide novel apparatus of the above character which is capable of detecting a failure such as interruption of the sensing element circuit and inactivates the heat regulator in response to such detection thereby avoiding an unsafe operating condition.

Another object is to disable the regulator not only when the sensing element is open-circuited, but also when this condition prevails along with shunting of the element by leakage resistance higher than the normal operating values of the element.

A further object is to control activation of the regulator by a novel transistor amplifier which provides an output signal of one phase for activating the regulator when the sensing element circuit is intact and of a different phase for disabling the regulator when the element is open-circuited.

A more detailed object is to provide novel fail-safe means for shifting the phase of the balanced network signal under different conditions of the sensing element circuit and distinguishing between the different phases so as to activate the condition regulator only when the circuit is intact.

Other objects and advantages of the invention will become apparent from the following detailed description taken in connection with the accompanying drawings, in which.

Figure 2:
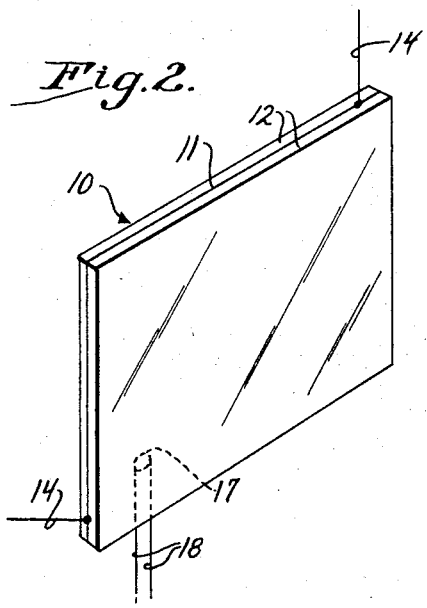
Fig. 2 is a fragmentary perspective view of a windshield whose temperature is being controlled.

While the invention is adaptable to different types of apparatus responsive to various conditions such as temperature, pressure, or conductivity of a solution, we have shown in the drawings and will describe in detail herein, the preferred embodiment which is a system for controlling the temperature of an aircraft windshield 10 (Fig. 2) and maintaining the same at a desired value. It is to be understood, however, that we do not intend to limit the invention by such disclosure but aim to cover all modifications and alternative constructions falling within the spirit and scope of the invention as expressed in the appended claims.

Figure 1:
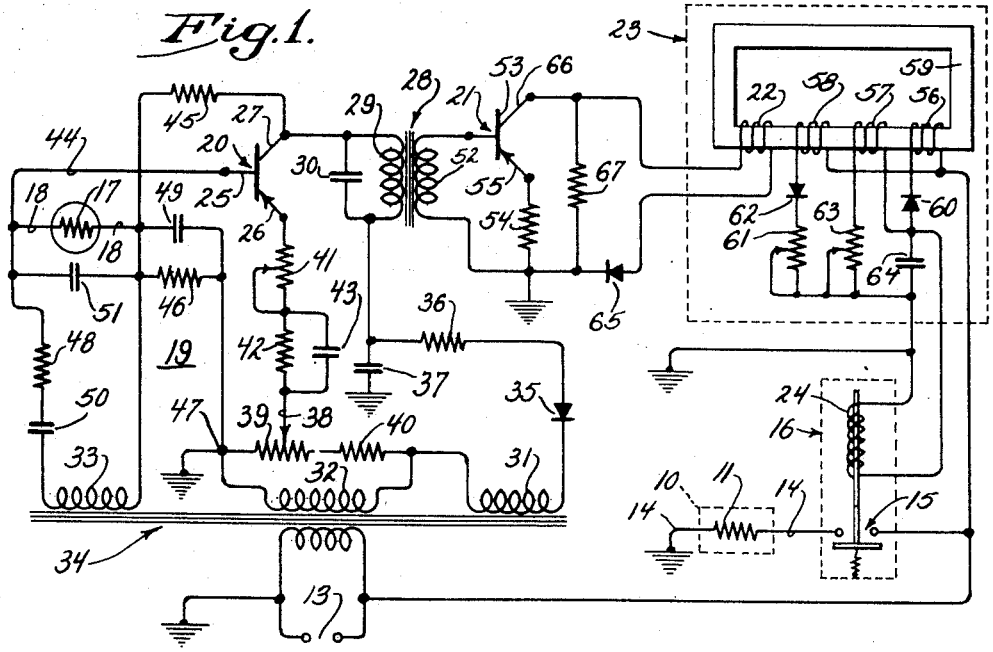
Figure 1 is a schematic view and wiring diagram of a control system embodying the novel features of the present invention.

In the exemplary control system, the windshield 10 comprises a heating element 11 in the form of a film of transparent conductive material such as tin oxide deposited on opposed surfaces of outer layers of glass 12 and having resistance so as to become heated when connected across a suitable source 13 of alternating current (Fig. 1). Conductors 14 connect the heater in an energizing circuit which extends in series through the source, the heater and normally open contacts 15 of a control relay 16. The latter is energized and deenergized respectively to complete and interrupt the circuit in accordance with variations of the windshield temperature below and above a desired value, for example, 100 degrees Fahrenheit. Such variations are sensed herein by a resistance element 17 disposed between the glass layers and having a negative temperature coefficient so that its resistance varies inversely with the windshield temperature. An element of this character is manufactured and sold by Victory Engineering Corp. of Union, New Jersey under the name, "Thermistor."

When the circuit through the sensing element 17 is intact, the element resistance varies through a predetermined range, for example, from around 97.5 ohms to approximately 77.5 ohms, with normal variations in the temperature of the windshield 10. Such variations are utilized to provide an electrical signal for controlling the relay 16 by connecting the sensing element 17 into a normally balanced network 19 through two conductors 18. The network provides an alternating current signal variable in phase and amplitude with changes in the value of the element above and below a balance value corresponding to the desired windshield temperature. This signal is applied to the input circuit of a transistor amplifier having an output signal which is utilized to vary the energization of the control relay in accordance with changes in the input signal. Under normal operating conditions with the circuit through the sensing element intact, the relay is energized to complete the heater circuit when the element resistance rises above a control value and is deenergized to interrupt the heater circuit when the element resistance is below the control value.

To facilitate an understanding of the exemplary control systems, the characteristics of transistors will be described briefly. Current flows through the collector as a function of current flow between the base and the emitter in what has been termed "transistor action" when the collector is biased relative to the base in a "nonconductive" direction. Such collector current is substantially independent of the value of collector bias through a wide range of such bias values, but, for small collector bias values, also varies as a function of such bias. This may be seen by referring to Fig. 3 which illustrates the manner of variation of collector current with nonconductive collector bias for different values of base current flow where the transistor is connected as a common-emitter amplifier with the emitter common to the input and output circuits as shown in Fig. 1. Thus, a collector voltage variation of a given amount in the range from 0 to 10 volts produces a large collector current change whereas a change of voltage the same amount in the range above 10 volts results in only a small change in collector current.

So far as base-emitter current flow is concerned, this varies with the base to emitter bias as long as the emitter is biased conductively relative to the base, such current being substantially independent of the collector current flow. With a nonconductive bias on the emitter, no matter how small, emitter current flow is blocked and transistor action ceases. Thus, the transistor operates as a rectifier so far as base-emitter current flow is concerned. In one type of transistor, for example, a p-n-p junction transistor as shown in Fig. 1, the collector is biased "nonconductively" for transistor action when its polarity is negative relative to the base and the emitter is biased "conductively" when it is positive relative to the base. For an n-p-n transistor, the polarities and directions of current flow are reversed.

In the form shown in Fig. 1, the transistor amplifier comprises two transistors 20 and 21 connected in successive stages. The first transistor 20 is connected as a common-emitter amplifier with the base 25 and the emitter 26 constituting input electrodes and the collector 27 and the emitter forming output electrodes. The output signal in the circuit between the output electrodes is transmitted through a transformer 28 having its primary 29 connected in series with the collector 27 and in parallel with a capacitor 30 acting to maintain the sinusoidal character of the output current.

Power for the balanced network 19 and the first transistor 20 is derived from three secondary windings 31, 32 and 33 of a step-down transformer 34 whose primary is connected across the source 13. To provide unidirectional nonconductive bias for the collector 27, two secondary windings 31 and 32 are connected in series with a rectifier 35 between the output primary 29 and ground, such voltage being filtered by a resistor 36 in series with the rectifier and a capacitor 37 connected between the resistor and ground. A variable control point resistor 39 having a slider 38 is connected in series with a fixed resistor 40 across the second secondary 32. To complete the output circuit, the slider 38 is connected to the emitter through a variable resistor 41 and a fixed resistor 42 with a parallel capacitor 43 providing compensation for ambient temperature changes. In this instance where a p-n-p transistor is used, the rectifier 35 is polarized to bias the collector negatively relative to the emitter.

To utilize the rectified voltage of the first and second secondary windings 31 and 32 for biasing the emitter 26 conductively relative to the base 25, one element conductor 18 is connected to the base by a conductor 44 and the other element conductor 18 is connected through a resistor 45 to the collector 27 and through a fixed bias resistor 46 to the grounded terminal 47 of the second secondary 32. The amount of unidirectional voltage applied between the base and emitter then is that appearing across the fixed bias resistor 46 and the portion of the control point resistor 39 between the slider 38 thereof and the ground terminal 47. In one control system constructed as now being described and having the desired operating characteristics, the source 13 supplied 115 volts at 400 cycles per second, the alternating voltage developed across each of the two secondary windings 31 and 32 was seven volts, the values of the control point resistor 39 and the resistor 40 in series therewith across the second secondary were 25 and 1000 ohms respectively, the values of the bias resistor 46 and the fixed resistor 45 between the collector and the sensing element were respectively 10,000 ohms and 100,000 ohms, and the values of the filtering elements 36 and 37 were 1000 ohms and 10 microfarads. The transistor 20 was a type 2N34 manufactured and sold by Sylvania Electric Products, Inc. of Woburn, Massachusetts.

Like the first transistor 20, the second transistor 21 is of the p-n-p junction type connected as a common emitter amplifier. A type GT803 transistor manufactured by Sylvania Electric Products, Inc. of Woburn, Massachusetts has been found to be satisfactory. The output signal of the first transistor appearing as the voltage across the secondary winding 52 of the output transformer 28 is applied to the input circuit of the second transistor by connecting the winding between the base 53 thereof and ground. The input circuit is completed through a resistor 54 connected between the emitter 55 and ground and effecting a degenerative action to compensate for changes in ambient temperature.

In the balanced network 19, an alternating voltage developed across the sensing element 17 is applied between the base 25 and the emitter 26 of the first transistor 20 in opposition to the alternating voltage developed across the control point resistor 39 between the slider and the grounded terminal 47 of the second secondary 32. Such element voltage is derived herein from the third secondary 33 by connecting the latter and a fixed resistor 48 in series between the element conductors 18, the phase of the voltage on the terminal of the element nearest the base being the same as that of the slider 38 applied to the emitter. With this arrangement, the element voltage varies directly with changes of the element resistance and the balanced network provides a signal of one phase or the other when the element voltage is respectively less than or greater than the control resistor voltage. A capacitor 49 for by-passing alternating current is connected across the direct current bias resistor 46.

Due to the negative temperature coefficient of the sensing element 17, its resistance corresponding to a windshield temperature below the desired value is higher than the element resistance at the desired value. Thus, when an open circuit occurs at the element, the apparent resistance of the element, that is, the resistance between the conductors 18 connecting the element into the balanced network 19, is higher than the control value at which the relay 16 is to operate. The balanced network thereby tends to indicate a need for heat regardless of the actual windshield temperature. A similar false indication of a windshield temperature below the desired value arises when the element is open-circuited but the conductors 18 are shunted by leakage resistance larger than the control value of resistance.

To avoid the hazardous condition of energization of the heater 11 when the sensing element 17 is open-circuited by disconnection from one of the conductors 18, the present invention contemplates detecting the difference between the lower resistance values across the conductors with the element circuit intact and the higher values with an open-circuited element and operating the relay 16 to complete the heater circuit only in response to the lower values. This is accomplished by the provision of novel fail-safe means which causes the balanced network to produce different signals with the sensing element circuit respectively interrupted and intact and which distinguishes between such signals so as to operate the relay 16 only in response to the intact signal.

Figure 7:
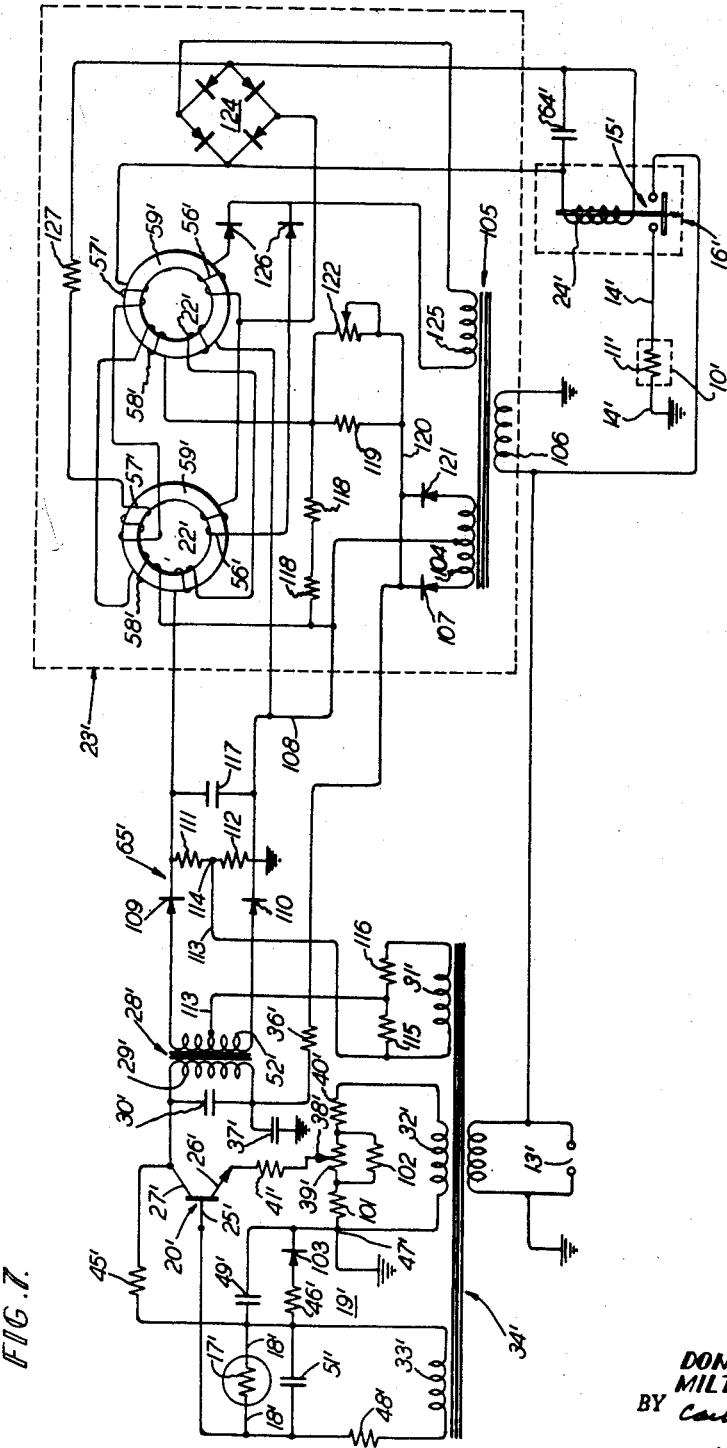
Fig. 7 is a view similar to Fig. 1 showing a modified control system.

In both forms of the invention illustrated in Fig. 1 and Fig. 7 respectively, the balanced network signals with the sensing element circuit interrupted and intact differ from each other in their phase with respect to a reference voltage such as that of the source 13. This difference is achieved by connecting a phase shift element 51 in a shunt around the sensing element. With the phase shift element, the balanced network 19 actually provides three different signals depending on the resistance of the sensing element and the condition of its circuit. A first signal of one phase with respect to a reference voltage occurs when the element is connected into the network and its resistance is above the balance value. A second signal of the opposite phase is provided when the element circuit is intact and the element resistance is below the balance value. When the element is open-circuited, the network signal is of a third phase intermediate the phases of the other two signals. To control the relay 16 in response to the different balanced network signals, the latter, after being amplified, are applied to an output means which includes a phase detector 65 and is capable of distinguishing among the different phases so as to energize the relay only in response to the first signal.

The fail-safe phase shift element 51 in both systems shown in Figs. 1 and 7 is a capacitor connected in parallel with the sensing element 17. In the system of Fig. 1, not only is the phase of the signal from the balanced network 19 shifted by the capacitor when the sensing element is open-circuited, but also, the unidirectional conductive bias between the input electrodes 25 and 26 of the first transistor 20 and thus the average output current of this transistor are reduced. For this purpose, a capacitor 50 is connected in series in each current path in the balanced network paralleling the conductive bias path extending through the sensing element and between the input electrodes 25 and 26.

In the present instance, other than the path through the phase shift capacitor 51, there is only one current path paralleling the path through the sensing element and extending between the input electrodes 25 and 26 of the first transistor 20. Such other path extends through the transformer secondary 33 supplying the alternating voltage to the element, the blocking capacitor 50 being connected in series with the secondary and the resistor 48. With this arrangement, the only direct current path between the input electrodes is through the sensing element. Thus, when this path is interrupted by an open circuit at the element, the unidirectional conductive bias between the base 25 and emitter 26 is removed. Also, advantage is taken of the rectifying characteristics of these input electrodes of the transistor to charge the capacitors 50 and 51 in a nonconductive direction with respect to the input electrodes when the amplitude of the alternating current signal from the balanced network exceeds the magnitude of the unidirectional conductive bias voltage. In a manner to be described later, this results in a reduction of the portion of the balanced network signal which is effective to energize the relay 16.

The output means in the system of Fig. 1 comprises the phase detector 65 and a magnetic amplifier 23 which cooperates with the detector to provide the desired control of the relay 16 in response to the amplified signal of the balanced network 19. The relay coil 24 is connected in the magnetic amplifier output circuit which extends in series from ground through the source 13, a load winding 56, a rectifier 60, the coil and back to ground. The load winding and three other windings 22, 57 and 58 are wound on a laminated core 59 of suitable magnetic material characterized by a rectangular hysteresis loop. To obtain a so-called "resetting action," the second or bias winding 58 is connected across the source 13 in series with a variable resistor 61 and a rectifier 62 polarized to conduct current during alternate half cycles when the load circuit rectifier 60 is blocking current flow. Also, the bias winding is wound on the core in a direction such that its flux opposes or "bucks" that of the load winding. The third or feedback winding 57 is connected in series with a variable resistor 63 across a capacitor 64 paralleling the relay coil 24. In addition to smoothing the voltage applied to the coil, the capacitor cooperates with the feedback winding and its resistor 63 operates to produce a flux opposing that of the bias winding during the half cycles of bias current flow.

The phase detector 65 is a half wave rectifier connected in series with the control winding 22 of the magnetic amplifier 23 between ground and the collector 66 in the output circuit of the second transistor 21. To complete this circuit which also includes the emitter resistor 54, a resistor 67 is connected between the collector on the ground in parallel with the control winding and the rectifier, this resistor maintaining the desired phase relation between the collector current and the voltage of the source 13. The polarity of the rectifier is such that current may flow from the collector through the control winding when the voltage induced in the winding due to flux in the core 59 biases the collector nonconductively. With this arrangement, such induced voltage provides the only bias for the collector. The direction in which the control winding is wound on the core is such that the collector bias voltage is induced in the control winding during the half cycles of current flow in the bias winding 58. With this arrangement, the flux produced by the control winding current acts in opposition to the flux due to bias winding current.

Other values of the various circuit elements in the balanced network 19 of the control system which was constructed as described above and provided the desired operation were as follows with the secondary winding 33 supplying an alternating voltage of 10 volts: 5000 ohms for the resistor 48, 1 microfarad for the blocking capacitor 50, .15 of a microfarad for the phase shift capacitor 51, and 10 microfarads for the capacitor 49 shunting the bias resistor 19. In the magnetic amplifier 23 which had a core comprising thirty-five laminations .006 of an inch thick formed of a material sold by Allegheny Ludlum Steel Corporation of Pittsburgh, Pennsylvania under the number "4750," the numbers of turns in the respective windings were 18 for the load winding 56, 250 for the feedback winding 57, 200 for the bias winding 58, and 300 for the control winding 22. The total values of the bias and feedback resistors 61 and 63 were 6000 ohms and 9000 ohms respectively and the resistance of the relay coil 24 was 10,000 ohms.

*Operation of Fig. 1 system*

Figure 4:
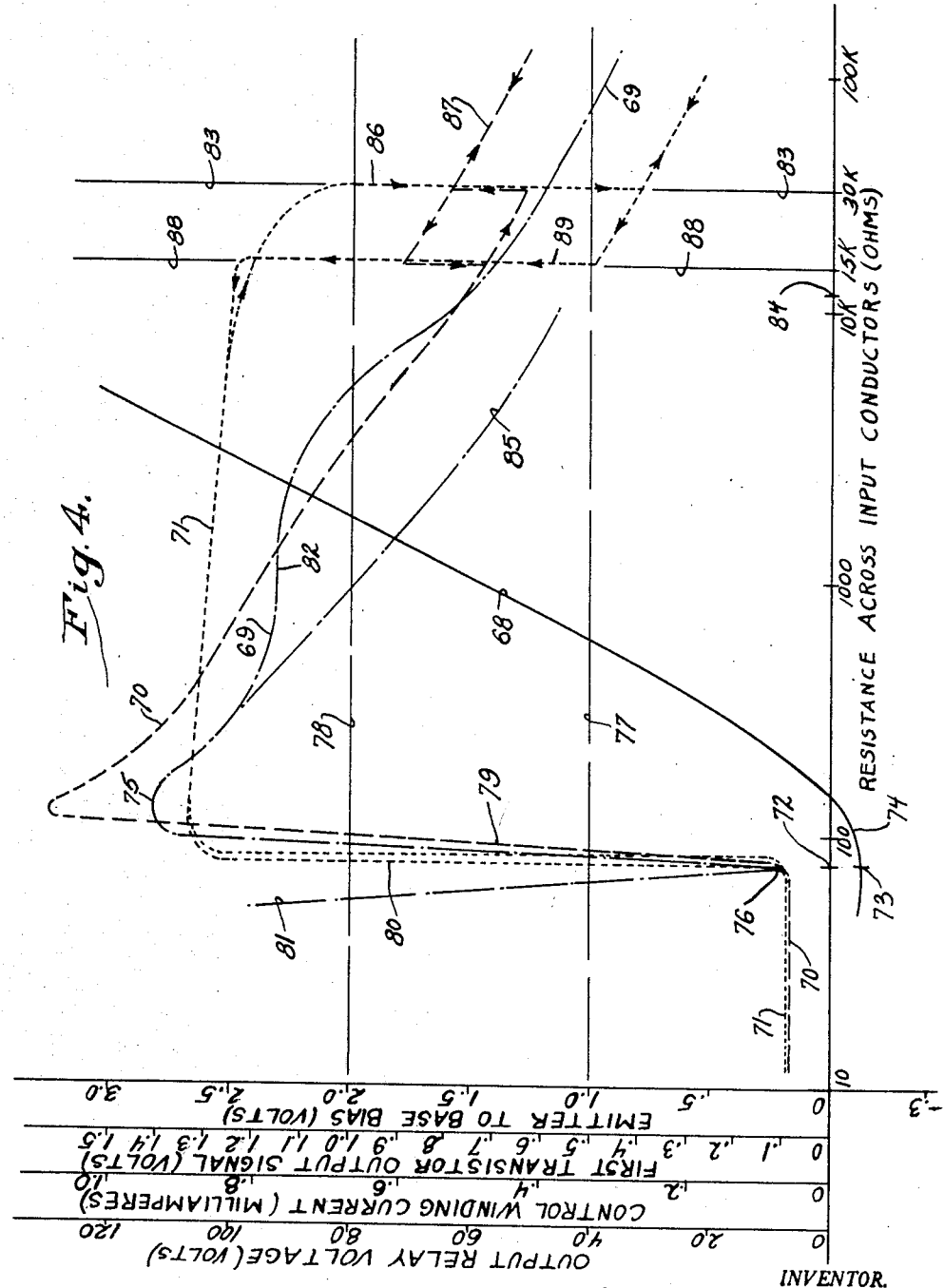
Figs. 4, 5 and 6 are charts showing the variation of different circuit conditions with changes of the controlling resistance in the control system of Fig. 1.

The operation of the control system of Fig. 1 will be described in connection with Figs. 4, 5 and 6 which are charts showing variations of different conditions in the control system with changes in the value of the resistance across the element conductors 18. In Fig. 4, a solid-line curve 68 represents the direct current potential of the base 25 of the first transistor 20 relative to the emitter 26, in volts, plotted against the resistance across the conductors 18 in ohms on a logarithmic scale. A dot-dash curve 69 represents the voltage in the secondary 52 of the output transformer 28 of the transistor 20 as measured on an alternating current meter, this current corresponding to the voltage in the primary winding 29. The curve 70 represents the current in the control winding 22. The desired voltage applied to the output relay coil 24 follows a dotted curve 71. All of the curves 68, 70 and 71 represent average values of the different electrical quantities measured on direct current instruments.

Figure 5:
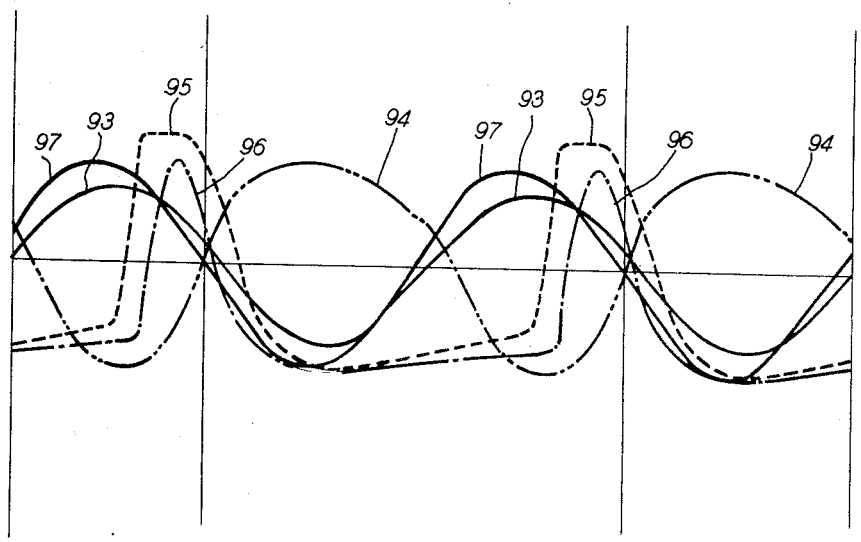

In Fig. 5, voltage is plotted against time with curves 93, 94, 95 and 96 representing the voltage across the primary winding 29 of the first transistor output transformer 28 for different values of resistance across the conductors 18 for the sensing element 17. The curve 97 is a reference voltage such as that provided by the secondary winding 33. In Fig. 6, the reference voltage represented by a curve 98 is plotted against the same time base used in Fig. 5, curves 99 and 100 representing current in the control winding 22 with different values of resistance across the conductors 18. All of the curves in Figs. 5 and 6 correspond to actual oscilloscope traces of the various voltages and currents.

With power available in the source 13, the system is prepared for operation by adjusting the slider 38 of the resistor 39 to select the control point, that is, the value of the resistance across the conductors 18 corresponding to the temperature of the windshield 10 at which it is desired to close the circuit for the heater 11. This resistance value is slightly higher than the null or balance value which is indicated at 72 in Fig. 4 and which herein is approximately 77.5 ohms corresponding to a temperature of 105 degrees Fahrenheit.

At the balance point 72, the alternating voltage between the conductors 18 is equal in amplitude to the bucking voltage across the active part of the control point resistor 39 in the emitter-base input circuit. By proper correlation of the values of the capacitors 50 and 51 with the element resistance and the series resistor 48, the element voltage at the balance point is substantially in phase with that of the secondary 33 and 180 degrees out of phase with the bucking voltage. Thus, no alternating voltage signal is provided by the balanced network 19. The emitter 26, however, is biased positively, that is, conductively relative to the base 25, by the full amount of the direct current potential across the bias resistor 46 and the active part of the control point resistor as indicated at 73 on the curve 68. The output voltage across the secondary 52 then is at its minimum which is above zero as shown by the curve 69 due to fluctuations in current in the primary 29 resulting from the use of rectified alternating current to provide the conductive bias.

With the resistance of the sensing element 17 at its balance value 72 so that the output signal of the first transistor 20 is at its minimum, the current through the collector 66 of the second transistor 21 and the control winding 22 of the magnetic amplifier 23 also is at its minimum. Under this condition, current flow in the load winding 56 during alternate half cycles of the source 13 raises the flux in the core 59 to a saturation level in one direction. However, in the intervening half cycles, the control winding current is low and the current in the bias winding 58 is effective to reset the flux to its saturation level in the opposite direction. Thus, most of the energy of the source in the load current half cycles is required to reestablish the flux at its maximum in the first direction so that the voltage across the relay coil 24 is of a small value indicated at 76 on the curve 71 and is well below both the pull-in and drop-out values indicated by lines 77 and 78. Relating the current flow in the bias and load windings to the reference voltage shown by the curves 97 and 98 in Figs. 5 and 6, bias current flows to effect the resetting action during positive half cycles of the reference voltage and current flows through the load winding in the negative half cycles.

Assuming that the circuit through the sensing element 17 is intact and that the element resistance is increasing from the balance value 72, the amplitude of the alternating voltage across the element increases to values above that of the bucking voltage of the control resistor 39. The phase of the element voltage at values near the balance point remains substantially the same as the phase of the secondary 33 for the element. Thus, with the increasing element resistance, the balanced network 19 supplies between the base 25 and the emitter 26 an alternating voltage signal in phase with the voltage of the secondary 33 and of an amplitude which increases with the amount of deviation of the element resistance above the balance value. The corresponding change in the output of the first transistor 20 appearing as the voltage across the primary 29 or secondary 52 of the transformer is an abrupt rise along the curve 69 to a peak 75. The shape and phase of this voltage at the peak as shown by the curve 93 in Fig. 5 closely approximate the shape and phase of the reference voltage of the curve 97.

As the output voltage of the first transistor 20 increases along the curve 69 to the peak 75, current flows through the collector 66 of the second transistor 21 and the control winding 22 in the same half cycles of the source 13 that current flows in the bias winding 58. Such current produces a control winding flux opposing that of the bias winding to reduce the resetting action of the latter. Less energy then is required from the loading winding 56 to saturate the core 59 in each of the intervening half cycles. This results in an increase in the voltage applied to the relay coil 24 and its parallel capacitor 64 during the load current half cycles. In the intervening half cycles when control winding and bias winding currents flow, the capacitor discharges through the feedback winding 57. The flux of the feedback winding being in a direction to oppose the flux of the bias winding, the resetting action thereof is reduced even further. Such feedback action is cumulative in successive cycles and the core "fires" or becomes saturated quickly with an abrupt increase of the relay voltage as indicated at 79 to a value higher than the pull-in value 78. The contacts 15 then close with a snap action to complete the circuit for energizing the heater 11.

The value of current in the control winding 22 needed to start the feedback action for firing the core 59 depends on the values of the resistors 61 and 63 in series with the respective bias and feedback windings 58 and 57 and is adjusted herein by varying the feedback resistor 63. The shape and phase of the control winding current when the relay 16 pulls in are shown by the curve 99 in Fig. 6. Referring to this figure, such current is substantially in phase with the reference voltage represented by the curve 98 and flows during a major portion of each positive half cycle of the reference voltage.

With the heater 11 energized and the temperature of the windshield 10 rising, the resistance of the sensing element 17 decreases to produce a corresponding decrease in the amplitude of the alternating signal of the balanced network 19 and reduction of voltage across the secondary 52 of the output transformer 28. The current through the second collector 66 and the control winding 22 also is reduced and finally becomes too small to maintain the core in its saturated condition. In other words, the control winding flux opposing the resetting action of the bias winding 58 is reduced and the resetting action is increased. More energy then is required from the load winding 56 and the voltage across the relay coil 24 and the feedback capacitor 64 is reduced. With the capacitor voltage reduced, the feedback action also is reduced. The action again is cumulative and the core "unfires" or becomes unsaturated after a few cycles thereby effecting a rapid drop in the relay voltage as indicated at 80 to a low value below the drop-out value. The relay 16 then drops out and the heater circuit is interrupted. The value of element resistance at which unfiring of the core and deenergization of the relay take place is determined in this instance by adjustment of the bias resistor 61.

When the resistance of the sensing element 17 decreases through and beyond its balance value 72, the output voltage of the first transistor 20 first drops quickly to zero and then increases as indicated at 81. The phase of the network signal and therefore the phase of the output voltage of the first transistor now are reversed, the curve 94 in Fig. 5 representing the output voltage of the first transistor under these conditions. With such phase reversal, no current flows in the control winding 22 because the input signal of the second transistor 21 is out of phase with the voltage on the colletcor 66 thereof. Thus, the resetting action of the bias winding is unopposed and the core remains in its unfired condition with the relay voltage on the curve 71 remaining below the drop-out value 77 until the element resistance rises high enough above the balance value for firing the core. Pull-in and drop-out of the relay 16 continue in this manner in response to fluctuations of the element resistance above and below the balance value to maintain the windshield temperature near the desired value so long as the circuit through the element remains intact.

To illustrate what happens when the sensing element 17 becomes open-circuited, let it be assumed that the element resistance increases beyond the control value where the relay 16 pulls in. During such increase, the amplitude of the alternating signal from the balanced network increases and actually exceeds the magnitude of the direct current conductive bias so that, in alternate half cycles, the base-emitter potential becomes nonconductive and base current flow is blocked. The base current flow then becomes intermittent and the blocking and phase shift capacitors 50 and 51 become charged with their base sides positive, that is, in a nonconductive direction with respect to the base, the amount of this charge increasing with the amplitude of the network signal. As a result, the average direct current potential between the base and the emitter 26 increases in a nonconductive direction as indicated at 74 on the curve 68 upon increase of the element resistance. This change of base to emitter potential also is believed to be due in part to the increase of total base to emitter resistance and the corresponding decrease of base current accompanying the increase of element resistance.

The value of resistance between the conductors 18 at which the average base to emitter bias becomes nonconductive is approximately the same as the value where the output voltage of the first transistor 20 reaches the peak 75 on the curve 69. As the element resistance increases beyond this value, the output voltage decreases. Such decrease occurs in spite of increases in the amplitude of the signal from the balanced network 19 because, as this amplitude becomes larger and the average base to emitter potential becomes more nonconductive due to charging of the capacitors 50 and 51, the period of base current flow during each cycle of the source 13 becomes shorter. The output signal then comprises pulses of increasing amplitude and shorter duration as contrasted with pulses of longer duration and smaller amplitude near the peak 75 of the average output voltage.

In decreasing from the peak value 75 during the increase of element resistance, the output voltage of the first transistor 20 drops first to a plateau 82 and then gradually from the latter to the value indicated along a line 83 at which the relay drops out. This particular shape of the output signal curve with the plateau 82 is desirable in order to maintain the output signal above its relay drop-out value until the resistance across the element conductors 18 is beyond the high limit 84 of the normal range of element values. The shape of the curve is determined by the values of the circuit components in the input circuit of the first transistor, particularly the capacitor 51 shunting the sensing element. In this instance, as noted above, the desired operation is obtained when the value of this capacitor is .15 of a microfarad. With the other components the same, a larger value of capacitance, for example, .45 of a microfarad produces a curve 85 which decreases gradually from the peak without a plateau and reaches the relay drop-out value at a much lower element resistance.

The average current in the control winding 22 reaches a peak at the same time that the output voltage of the first transistor 20 reaches its peak 75. Then, the control winding current decreases gradually along its curve 70 until the resistance between the conductors 18 reaches the drop-out value 83. At this value, the control winding current is incapable of sustaining the fired condition of the magnetic core 59 and, due to the cumulative action of the feedback winding 57 and the capacitor 64 and the reset action of the bias winding 58, the core "unfires" or loses its saturation. The relay voltage then drops quickly as indicated at 86 to a value below the drop-out value 77. Also, the average control winding current rises sharply from the curve 70 to a higher value on a curve 87, the amplifier core remaining unsaturated with the control winding current at such higher value. With the resistance between the element conductors 18 increasing beyond the drop-out value 83, the control winding current decreases along the curve 87.

The inability of the control winding current to sustain the fired condition of the amplifier core 59 with resistance values at and above the drop-out value 83 is believed to be due, not only to the shortened duration of the pulses of the output voltage of the first transistor 20 resulting from charging of the capacitor 50 and 51, but also to the shift in phase of such pulses caused by the capacitor 51 shunting the sensing element 17. Referring to Fig. 5 in which the curve 95 represents the voltage in the transformer primary 29 at the drop-out value 83 of resistance, it will be seen that the positive pulses of this voltage last through only one-fourth of each cycle or half as long as the positive pulses of the curve 93 of the voltage at the relay pull-in value of element resistance near the balance value 72. Also, the phase of the positive pulses on the curve 95 for the drop-out value 83 are displaced approximately 70 degrees from the pulses on the curve 93 for the pull-in value.

Figure 6:
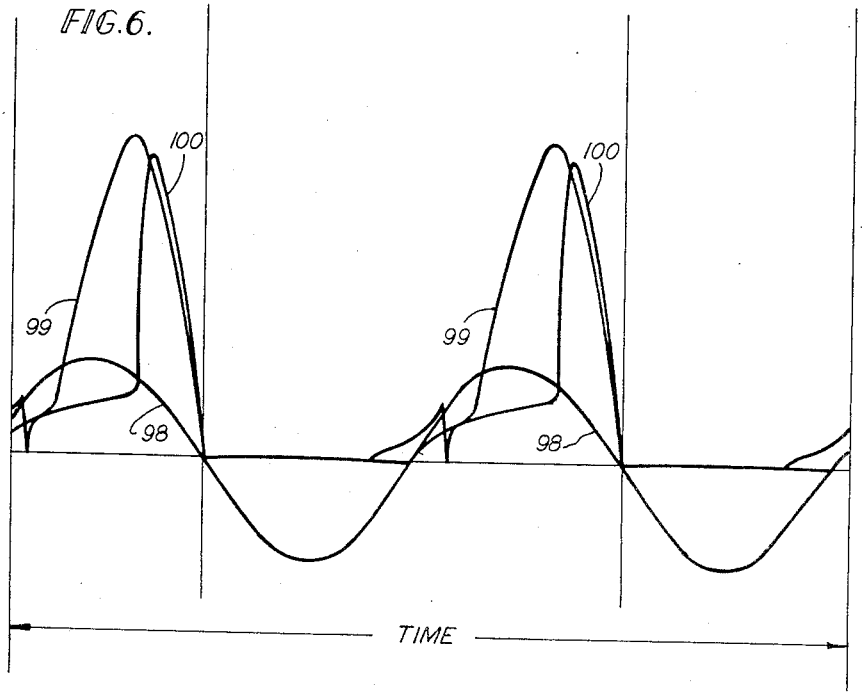

The control winding current resulting from the shorter positive voltage pulses of different phase constitutes pulses of very short duration indicated by the curve 100 in Fig. 6 and occurring at the end of the positive half cycle of reference voltage on the curve 98. An even shorter duration and greater phase shift of the positive pulses of the first transistor output voltage are present as shown by the curve 96 in Fig. 5 when the sensing element is open-circuited so that the resistance between the conductors 18 is infinite. The resulting shorter and different phased control winding pulses are ineffectual to overcome the resetting action of the bias winding 58 and the relay 16 thus remains deenergized so that the circuit for the heater 11 is open.

Assuming that the resistance across the conductors 18 is reduced gradually from a value above the drop-out value 83, the output voltage of the first transistor 20 follows the same curve 69 as it did for increasing resistance values. The control winding current, however, increases along its second curve 87 until the resistance reaches a pull-in value indicated by a line 88 and then drops abruptly as indicated at 89 to the first curve 70 which it follows as the resistance decreases further. At the pull-in value 88, the core fires and the relay voltage increases abruptly as indicated at 89 to energize the relay 16.

Figure 3:
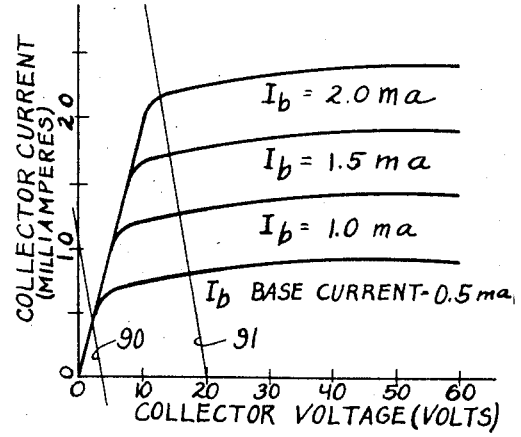
Fig. 3 is a chart of some operating characteristics of transistors.

The shift of control winding current between its two curves makes possible a desired narrow differential between the drop-out and pull-in resistance values 83 and 88 beyond the normal range of element resistance. Such shifting is believed to result from using only voltage induced in the control winding to bias the collector 66 of the second transistor. Thus, when the core 59 is saturated and the control winding current is decreasing along the curve 70 near the drop-out resistance value 83, the flux variations are small and the induced control winding voltage which biases the collector is correspondingly small. This condition is represented in Fig. 3 by a load line 90 which intersects the family of base current curves at a low value of collector current.

When the control winding current reaches its lowest value on the curve 70 (Fig. 4) and the core 59 unfires, the flux variations in the core increase and the collector 66 is biased by a larger induced voltage. Under this condition represented by a load line 91 in Fig. 3, the collector current is increased with a corresponding rise of control winding current to the curve 87 (Fig. 4) even though the input signal to the second transistor 21 has changed only slightly. A similar but reverse action occurs when the core refires and control winding current drops from the higher curve 87 to the lower curve 83. At resistance values near the balance point 72, the control winding current also changes abruptly during firing and unfiring of the core but these changes are small. This is apparently due to the long duration of the positive pulses of the output voltage of the first transistor as compared to the shorter duration of the pulses at resistance values beyond the normal range.

*The modified system of Fig. 7*

Figure 8:
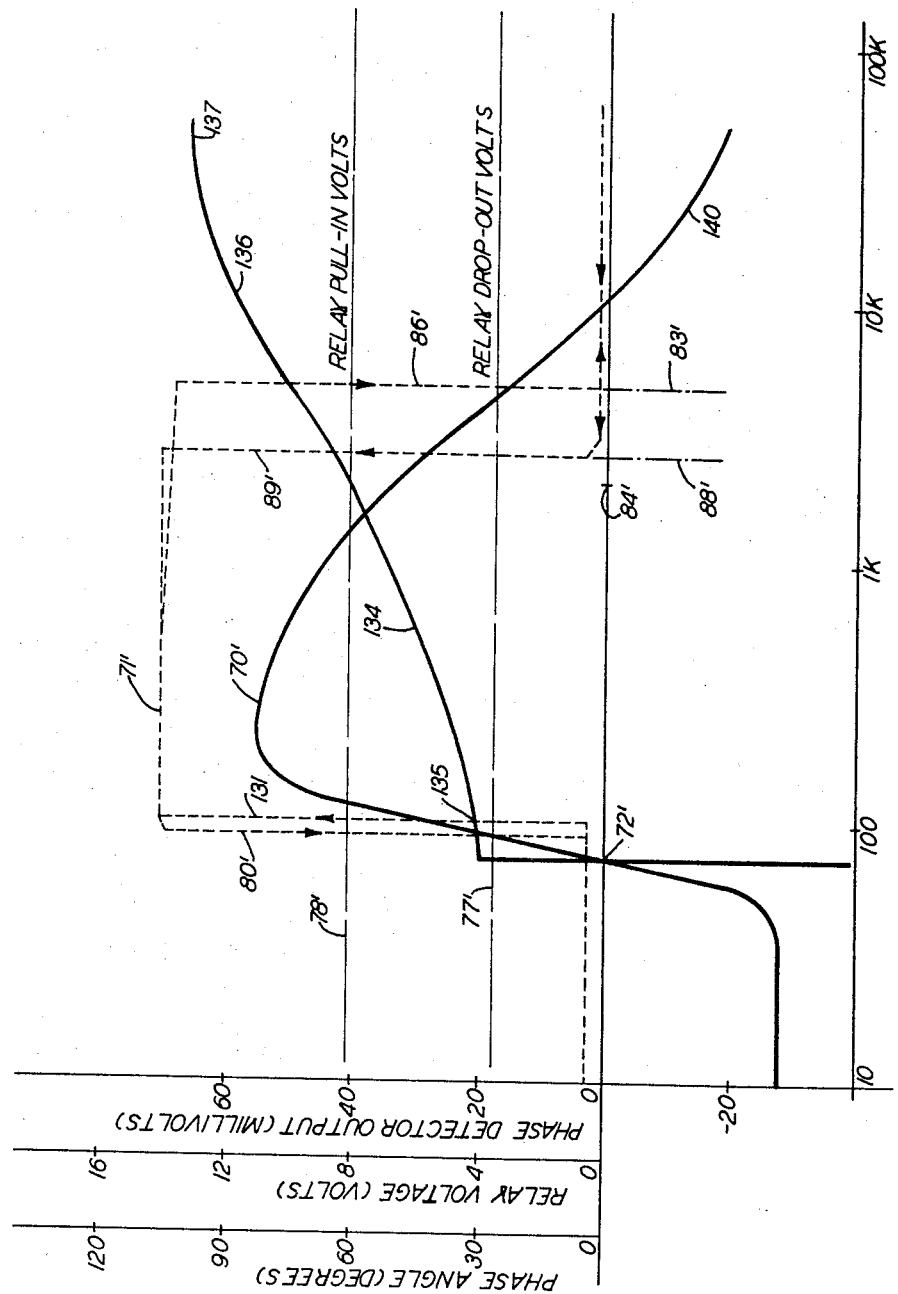
Figs. 8, 9 and 10 are views similar to Figs. 4, 5 and 6 showing the variation of circuit conditions in the modified system.

In Figs. 7 to 10, parts and curves corresponding to parts and curves in Figs. 1, 4, 5 and 6 bear similar but primed reference characters. As in the Fig. 1 system, the modified system of Fig. 7 includes a negative temperature coefficient sensing element 17' which is connected by conductors 18' into a normally balanced network 19' to provide to the input electrodes 25' and 26' of a transistor 20' an alternating current signal variable in phase and amplitude with deviations of the element resistance above and below a balanced value 72' (Fig. 8).

Variations in the transistor output signal appearing as the voltage applied to the primary 29' of an output transformer 28' are utilized to control the energization of a relay 16' through an output means including a phase detector 65' and a magnetic amplifier 23'.

The balanced network 19' is generally similar to the network 19 of Fig. 1 with transformer secondaries 33' and 32' respectively applying an alternating voltage to the sensing element 17' and a bucking voltage across the variable control point resistor 39' and the series resistor 40'. The Fig. 7 network differs in the omission of the blocking capacitor 50 in series with the resistor 48' and the secondary 33' for the sensing element and in the addition of resistors 101 and 102 respectively in series and in parallel with the control point resistor 39'. A germanium diode 103 having a forward conducting resistance with a negative temperature coefficient is connected in series with the bias resistor 46' so that its forward conducting resistance is added to the bias resistance. This tends to compensate for changes of the characteristics of the transistor 20' with temperature to maintain a substantially constant current flow in the collector 27'. The transistor 20' is of the n-p-n type 201A sold by Texas Instruments, Incorporated of Dallas, Texas.

The unidirectional voltage for biasing the collector 27' and the base 25' relative to the emitter 26' is obtained from a secondary winding 104 of a transformer 105 which supplies the magnetic amplifier 23' and has its primary winding 106 connected across the source 13'. Opposite end terminals of this secondary are connected to the collector through individual rectifiers 107 and 121, the filter resistor 36' and the output primary 29'. To complete the collector bias circuit, a center tap of the secondary is connected to the emitter through a conductor 108, the ground connection 47', the resistor 101, the control point resistor 39, the slider 38' and the resistor 41'. A bias voltage is developed across the diode 103 and the resistor 46' by connecting the terminal of the latter nearest the base to the collector through the resistor 45'. The rectifiers 107 and 121 are polarized so that both the collector and the base are biased positively with respect to the emitter, this being a nonconductive bias for the collector and a conductive bias for the base with the n-p-n type of transistor shown.

As in the Fig. 1 system, the modified system includes a fail-safe means with a capacitor 51' connected in a shunt around the sensing element 17' and operating to shift the phase of the signal of the balanced network 19' from its normal value occurring when the element circuit is intact and the element resistance is above the balance point to a different value when the element is open-circuited. Whereas the Fig. 1 system utilizes both this phase shift and reduction of the duration of the balanced network pulses due to charging of the capacitors 50 and 51, the desired control of the relay 16' is achieved in the modified system in response to the phase shift alone. To this end, the phase detector 65' provides direct current output signals of opposite polarities in response to the differently phase signals of the balanced network. The magnetic amplifier 23' distinguishes between these direct current signals and energizes the control relay 16 when the phase detector signal is of the polarity corresponding to the network signal when the sensing element circuit is intact.

The phase detector 65' is of the so-called full wave reversible type having individual half-wave rectifiers 109 and 110 connected in series with the respective halves of the output transformer secondary 52' between the end terminals of the latter and the remote terminals of two series connected output resistors 111 and 112. An alternating reference voltage is applied between two conductors 113 connected respectively to the center tap of the secondary 52' and to the junction 114 of the output resistors. This voltage appears across a resistor 115 connected in series with another resistor 116 across the first secondary winding 31' of the transistor supply transformer 34'.

With the phase detector 65' constructed as described above, current flows through the two output resistors 111 and 112 toward the junction 114 in equal amounts in successive half cycles of the reference voltage across the conductors 113 either when there is substantially no voltage across the respective halves of the output secondary 52' as occurs with the sensing element 17' at its balance value 72' or when there are voltages of opposite phase in the secondary halves and these voltages are 90 degrees out of phase with the reference voltage. When voltages induced in the secondary halves are of any other phase with respect to the reference voltage, current flow through one of the output resistors is greater than the current in the other resistor depending on which of the secondary voltages is more closely in phase with the reference voltage. Such current is filtered by a capacitor 117 connected across the output resistors and a unidirectional voltage of one polarity or the other depending on the relative magnitudes of the different currents in the resistors appears across the capacitor as the output voltage of the phase detector.

The magnetic amplifier 23' is of the type providing a direct current output signal in response to a direct current input signal of one polarity and no output signal when the input signal is of the opposite polarity. In the amplifier shown for purposes of illustration, a control winding 22' comprises two sections connected in series across the output capacitor 117 of the phase detector 65' and wound separately on two magnetic cores 59'. A bias winding 58' similarly comprises two sections connected in series and wound individually on the respective cores. Two resistors 118 are connected in series across the bias winding and one terminal of the winding is connected through the conductor 108 to the center tap of the secondary 104 of the supply transformer 105 for the amplifier. The other terminal of the bias winding is connected to the end terminals of the secondary through a resistor 119, a conductor 120, and the individual rectifiers 107 and 121 in series with the respective halves of the secondary to provide a full wave rectified voltage across the winding. A variable resistor 122 is connected in parallel with the resistor 119 in the bias winding circuit to provide adjustment of the value of phase detector volatge to which the amplifier responds for drop-out of the relay 16'. Also, if desired, suitable other means (not shown) may be provided for adjustment of the value of phase detector voltage at which the relay pulls in.

The output circuit of the magnetic amplifier 23' extends in series through the coil 24' of the relay 16' and between the output terminals of a full wave rectifier 124. One input terminal of the latter is connected to one terminal of another secondary 125 of the amplifier transformer 105 and the other rectifier input terminal is connected by a conductor to a junction between two sections of a load winding 56'. Each of these sections is connected in series with a half wave rectifier 126 in a separate circuit between the junction of the sections and the other terminal of the secondary 125. Feedback action similar to that of the Fig. 1 amplifier 23 is obtained with a capacitor 64' connected in parallel with the relay coil 24' and a feedback winding 57'. The latter is formed in two sections wound individually on the two cores 59' and connected in series with a temperature compensating resistor 127 between the output terminals of the full wave rectifier 124.

*Operation of the modified system*

Assuming that power is being supplied by the source 13 and that the resistance of the sensing element 17' is at its balance value 72' (Fig. 8), the alternating current output of the balanced network 19' is zero and substantially no alternating current voltage is induced in the secondary 52'. The outputs of the phase detector 65' and the magnetic amplifier similarly are substantially zero so that the relay 16' is deenergized. This will be apparent by referring to Fig. 8 in which curves 71' and 70' represent respectively the relay voltage and the unidirectional output voltage of the phase detector both plotted against the resistance across the conductors 18' for the sensing element.

Figure 9:
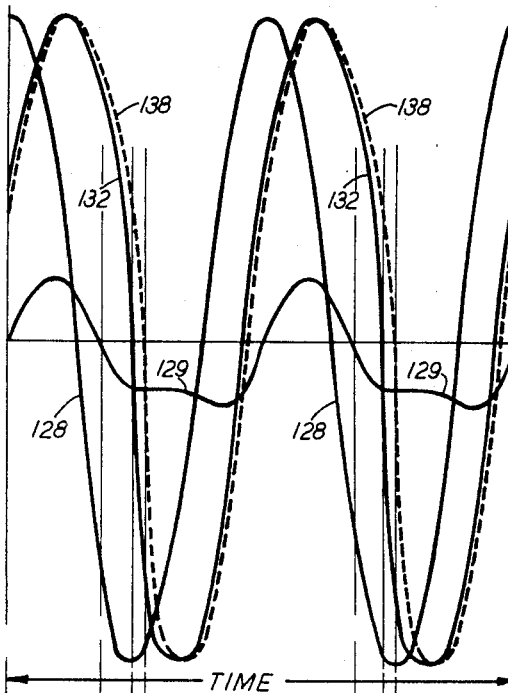
Figure 10:
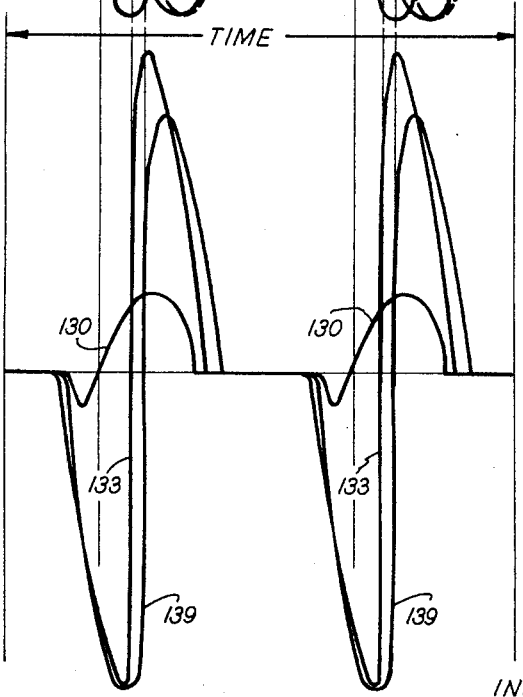

With a decrease of windshield temperature producing a rise of sensing element resistance slightly above the balance value 72', the balanced network 19' applies to the input of the transistor 20' an alternating current signal substantially in phase with the voltage across the secondary 33' supplying the element and with the reference voltage between the conductors 113 in the phase detector 65'. This signal is amplified by the transistor and applied to the primary 29' of the output transformer 28'. For a purpose to appear later, the phase of the amplified signal as it is applied to the primary is shifted slightly from the reference voltage by selecting the proper value for the capacitor 30' shunting the primary. The desired amount of such phase shift is approximately thirty degrees as shown in Fig. 9 in which the curves 128 and 129 represent respectively the reference voltage between the conductors 113 in the phase detector 65' and the voltage across the output primary when the element resistance has increased far enough for pull-in of the relay 16'.

When the voltage of the primary 29' is approximately 30 degrees out of phase with the reference voltage, the voltages of the different halves of the secondary 52' are respectively 30° and 150° out of phase with the reference voltage. The resulting current flow in one output resistor of the phase detector 65', for example, the upper resistor 111, then is greater than that in the lower resistor 112 in successive half cycles of the reference voltage. This condition when the relay 16' pulls in is represented by a curve 130 in Fig. 10 in which the currents in the output resistors are plotted against the same time base used in Fig. 9, the portions of the curves above the abscissa axis representing the current in the upper resistor 111 and the portions below representing currents in the lower resistor 112. With the upper resistor current substantially greater than the lower resistor current as shown by the curve 130, a unidirectional voltage filtered by the phase detector capacitor 117 is applied to the control winding 22'. The polarity is such that the magnetic amplifier 23' responds to this voltage and a corresponding voltage is applied to the relay coil 24'.

The increase of the relay voltage resulting from the increase of the resistance of the sensing element is apparent from a curve 71' in Fig. 8. From this, it will be seen that the relay voltage remains near zero until the voltage from the phase detector 65' has increased far enough that the cores 59' fires. Then, the voltage increases abruptly as indicated at 131 beyond the relay pull-in value 78' and remains above such value until the resistance across the conductors reaches a fail-safe value indicated by a line 83'. The core then become unsaturated and the relay voltage drops abruptly as indicated at 86' to a value below the drop-out value 77'. As in the Fig. 1 system, this resistance value is beyond the high limit 84' of the normal range of sensing element resistance when the circuit through the element is intact. The fail-safe and high limit values 83' and 84' of the modified system are lower than the corresponding values 83 and 84 of the Fig. 1 system because, although only one sensing element is shown in Fig. 7, the modified system was designed for use with a plurality of such elements connected in parallel between the conductors 18'.

The drop of relay voltage at the fail-safe resistance value 83' is a direct result of the shift in phase of the balanced network signal caused by the capacitor 51' shunting the sensing element 17'. This phase shift is shown in Fig. 9 in which the curve 132 represents the voltage applied to the output primary 29' at the fail-safe resistance value 83'. Comparing this curve with the curves 128 and 129, the output primary voltage at the fail-safe value is approximately 60 degrees out of phase with the output primary voltage when the relay 16' pulls in as represented by the curve 129 and approximately 90 degrees out of phase with the reference voltage shown by the curve 128. When the primary voltage and the reference voltage have this phase relation, the currents flowing in opposite directions through the output resistors 111 and 112 in successive half cycles of the reference voltage are approximately equal as shown by the curve 133 in Fig. 10. The unidirectional voltage applied to the control winding 22' then is substantially zero to produce the abrupt drop of the voltage across the relay coil 24' substantially to zero at the fail-safe resistance value 83'.

The phase shift caused by the capacitor 51' also is shown by a curve 134 in Fig. 8. Thus, when the relay pulls in with the element resistance slightly above the balance value, the primary voltage of the output transformer 28' has a phase angle of approximately 30 degrees as indicated at 135 with respect to the reference voltage. As the resistance across the conductors 18' increases, this angle also increases until it reaches 90 degrees as indicated at 136 at a resistance value slightly above the fail-safe resistance value 83'. With resistances higher than this, the angle increases more until it finally becomes substantially constant at a value of approximately 100 degrees as indicated at 137, this being the angle when the sensing element 17' is open-circuited. The reason for the initial phase shift of 30 degrees due to the capacitor 30' across the primary 29' is to obtain the 90 degree phase angle of the primary voltage with respect to the reference voltage at the fail-safe resistance 83' and the even greater phase angle under open element conditions so as to insure that the relay 16' remains deenergized.

Subtracting the 30 degree phase shift due to the capacitor 30' across the output primary 29', the capacitor 51' shunting the sensing element causes a phase shift of approximately 70 degrees between the balanced network signals occurring respectively when the resistance between the conductors 18' is of the pull-in value slightly above the balance value 72' and when the element is open-circuited so that the resistance is infinite. The voltage applied to the output primary 29' under open element conditions is represented by a curve 138 in Fig. 9. Being more than 90 degrees out of phase with the reference voltage of the curve 128, such primary voltage results in a greater current flow through the lower output resistor 112 than in the upper resistor 111 as shown by the curve 139 in Fig. 10. The phase detector output voltage then is negative as indicated at 140 in Fig. 8 so that the voltage across the relay coil 24' remains well below the pull-in value 78'.

Assuming that the resistance across the conductors 18' is reduced gradually from a value above the drop-out value 83', the output voltage of the phase detector 65' follows reversely along the same curve 70' which it followed for increasing resistance values. The phase angle between the reference voltage and the voltage of the output primary decreases along the curve 134 and the phase detector voltage increases through zero on the curve 70' and becomes positive at approximately the drop-out value 83' of resistance. When the resistance reaches a value indicated by a line 88' lower than the drop-out value, the phase detector voltage is high enough that the magnetic amplifier cores 59' fire and the relay voltage increases abruptly as indicated at 89' to a value well above the pull-in value 78'. The relay then pulls in to complete the energizing circuit for the heater 11'.

As the resistance across the conductors 18' decreases from the pull-in value 88′, the relay voltage remains above both the pull-in and drop-out values 78′ and 77′ until the resistance approaches close to the balance value 72′. Here, the input signal to the transistor 20′ from the balanced network 19 and thus the phase detector voltage have decreased far enough that the fired condition of the amplifier cores 59′ cannot be maintained and the relay voltage drops abruptly and substantially to zero as indicated at 80′ in Fig. 8. The relay then drops out. As the resistance reaches and decreases beyond the balance value 72′, the phase of the signal from the balanced network 19′ and the output primary voltage are shifted 180 degrees so that the curve 134 of the angle of the primary voltage drops quickly through and beyond zero. The phase detector output voltage similarly decreases through and beyond zero as the resistance decreases through and beyond the balance value 72′.

It will be apparent that both the Fig. 1 and Fig. 7 systems are capable of distinguishing between high resistances within the normal range of values of the sensing element and higher resistances beyond this range. Thus, it is possible not only to control energization of the heater 11 and thus the temperature of the windshield 10 in response to variations of the resistance of the sensing element while the circuit through the element is intact, but also, the heater is disabled or inactivated so as to avoid an unsafe condition when the element is open-circuited. In both systems, such distinction between the different resistance values is achieved by the fail-safe means including the phase shift capacitor 51 and the phase detector 65.

The fail-safe means in the Fig. 1 system also includes the capacitor 50 in series with the transformer secondary 33 and, through the charging of this capacitor and the phase shift capacitor 51, achieves a reduction in the average output current of the first transistor 20 as well as a phase shift when the sensing element is open-circuited. By using the induced voltage in the control winding 22 of the magnetic amplifier 23 to bias the collector 66, a small differential may be maintained between the high values 83 and 88 at which the relay 16 drops out and pulls in. In the Fig. 7 system, the heater 11′ is disabled in response to the phase shift alone by virtue of the full-wave reversible output phase detector 65′ which not only is sensitive to phase differences of only 90 degrees, but actually provides a negative output signal to insure that the relay 16′ remains deenergized when the sensing element is open-circuited.

This application is a continuation-in-part of our co-pending application Serial No. 595,283, filed July 2, 1956, now abandoned.

We claim as our invention:

1. In a temperature control system, the combination of, a transistor amplifier stage having an input circuit coupled between the base and emitter electrodes of the transistor, a sensing element having a resistance variable within a predetermined range and inversely with changes in a temperature being controlled, circuit control means operable when activated to complete a circuit for raising said controlled temperature, means for connecting a first source of alternating voltage to said element to produce across the element an alternating voltage variable in amplitude with change of said resistance, a second source of alternating voltage, said input circuit including said sensing element and said second source in series and phased oppositely to the voltage of said first source to provide, while the circuit through the element is intact, an alternating current input signal of the first phase or the opposite phase in response to variation of the value of the element above and below a selected value within said range, a capacitor in said input circuit shunting said sensing element for substantially shifting the phase of said signal from said first phase to an intermediate phase when an open circuit develops at the element so that the apparent resistance of the element is beyond said range, an output circuit connected between the emitter and collector electrodes of said transistor amplifier stage for providing an output current variable in phase and amplitude with corresponding changes in said input signal, and output means including a phase detector controlling said circuit control means in response to changes in said output current and operable to activate the circuit control means when said input signal is of said first phase and to disable the circuit control means when the input signal is of said intermediate or said opposite phase.

2. In a temperature control system, the combination of, a transistor base-input, common-emitter amplifier stage having an input circuit and an output circuit, a sensing element having a resistance variable within a predetermined range and inversely with changes in a temperature being controlled, circuit control means operable when activated to complete a circuit for raising said controlled temperature, means for connecting a first source of alternating voltage to said element to produce across the element the alternating voltage variable in amplitude with changes of said resistance, a second source of alternating voltage, said input circuit including said sensing element and said second source in series and phased oppositely to said voltage of said first source to provide, while the circuit through the element is intact, an alternating current input signal of a first phase and the opposite phase respectively in response to variation of the value of the element above and below a selected value within said range, output means including a phase detector controlling said circuit control means in response to current flow in said output circuit to activate the circuit control means when said input signal is of said first phase, and fail-safe means for inactivating said circuit control means when an open circuit occurs at said sensing element comprising a capacitor connected in said input circuit in a shunt around said sensing element for substantially shifting the phase of said input signal from said first phase to an intermediate phase when an open circuit occurs at the sensing element.

3. In a system for controlling a condition, the combination of, a transistor amplifier stage having the transistor base and emitter as input electrodes and having one of said input electrodes and the transistor collector as output electrodes, a sensing element having an impedance variable with changes of said condition and through a normal operating range, means for connecting a first source of alternating voltage to said element to produce across the element an alternating voltage variable in amplitude with changes of said impedance, means for connecting a second source of alternating voltage in a series circuit with said element between said input electrodes and phased oppositely to said voltage of said first source to provide an alternating current input signal variable in phase and amplitude with changes of said impedance above and below a control value when the circuit through the element is intact, a phase shift element shunting said element and operable to substantially shift the phase of the signal applied between said input electrodes to a value between the phases of said first and second sources when the element becomes open-circuited, an output circuit connected between said transistor output electrodes for providing an alternating ouput current variable in phase and amplitude with corresponding changes of current flow between the input electrodes, condition regulating means, and means including a phase detector responsive to said output current and operable to activate said regulating means when said input signal is of the phase of said first voltage source and to disable the regulating means when the input signal is of said intermediate phase or of the phase of said second source.

4. In a condition control system, the combination of, a transistor amplifier stage having the transistor base and emitter as input circuit electrodes and having one of said electrodes and the collector electrode as output circuit electrodes, a sensing element having an impedance variable within a predetermined range and inversely with changes in the value of a condition being controlled, means for connecting a first source of alternating voltage to said element to produce across the element an alternating voltage variable in amplitude with changes of said impedance, a second source of alternating voltage, an input circuit including said sensing element and said second source connected in series between said input electrodes with said second source phased oppositely to said voltage across said sensing element for providing, while the circuit through the element is intact, an alternating current input signal of a first phase and of the opposite phase in response to variation of the value of the element above and below a selected value within said range, an output circuit connected between said output electrodes for providing an output current variable in phase and amplitude with corresponding changes in current flow in the input circuit, a load device for controlling said condition, output means controlling said load device in response to changes in said output current and including a phase detector for sensing differences in the output current corresponding to different phases of said input signal, said output means operating to activate said load device when said input signal is of said first phase and inactivate the device when the signal is of said opposite phase, and fail-safe means for inactivating said load device when an open circuit occurs at said sensing element, said fail-safe means including said output means and a capacitor connected in said input circuit in a shunt around said sensing element for substantially shifting the phase of said input signal from said first phase to an intermediate phase when an open circuit occurs at the sensing element so that the apparent impedance of the element is beyond said range.

5. In a condition control system, the combination of, a transistor having base and emitter terminals as input circuit electrodes and having one of said terminals and the collector terminal as output circuit electrodes, a sensing element having an impedance variable within a predetermined range and inversely with changes in the value of condition being controlled, a first alternating voltage source connected to said sensing element to provide an alternating voltage across the element variable in amplitude with changes of said impedance, a second source of alternating voltage, and an input circuit connecting said sensing element and said second voltage source in series between said input electrodes with said second source phased oppositely to said voltage across said sensing element for providing, while the circuit through the element is intact, an alternating current input signal of a first phase and of the opposite phase respectively in response to variation of the value of the impedance of said element above and below a selected value within said range, a capacitor connected in said input circuit in a shunt around said sensing element for substantially shifting the phase of said signal from said first phase to an intermediate phase when an open circuit develops at the element so that the apparent impedance of the element is beyond said range, an output circuit connected between said transistor output electrodes for providing an output current in said output circuit variable in phase and amplitude with corresponding changes in said input signal, and output means responsive to changes in said output current and including a phase detector for sensing differences in the output current corresponding to said different phases of said input signal.

6. The combination of claim 5 in which said input circuit includes means providing a source of unidirectional conductive bias for the input circuit electrodes and a capacitor in addition to the capacitor shunting said element connected in series with said first alternating source to confine direct current flow to a single path through the element, said transistor completing a circuit for charging said capacitors in a direction to apply a nonconductive bias voltage between the input electrodes when the amplitude of said alternating current signal exceeds the magnitude of said unidirectional conductive bias voltage.

7. The combination of claim 5 in which said input circuit includes means providing a source of unidirectional conductive bias for the input circuit electrodes and having a capacitor in series with said first alternatnig voltage source cooperating with the shunting capacitor to confine direct current flow between the input electrodes to a single path through the sensing element.

8. The combination of claim 5 in which said phase detector provides a unidirectional output signal of a first polarity in response to said output current corresponding to said first phase and of the opposite polarity in response to the output current corresponding to said intermediate and opposite phases and said output means includes condition regulating means activated by said output signal of said first polarity and disabled when the output signal is of said opposite polarity.

9. In a condition control system, the combination of, a transistor amplifier stage having as input circuit electrodes the transistor base and emitter and having as output circuit electrodes said base or emitter and the transistor collector, an output circuit connected between said output electrodes for providing an alternating output current variable in phase and amplitude with corresponding changes of current flowing in an input circuit, a reversible output phase detector responsive to said output current and providing a unidirectional output signal of one polarity when the output current is of a first phase and of the opposite polarity when the output current is of the opposite phase, a condition sensing element having an impedance variable with changes of a condition being controlled, a first alternating voltage source connected to said sensing element to provide a voltage there across variable with said impedance, a second alternating voltage source, an input circuit connecting in series between said input electrodes said sensing element and said second alternating voltage source in opposite phase to voltage across said sensing element for providing an alternating current input signal to produce said output current of said one phase and said opposite phase respectively as said impedance varies above and below a control value within a normal operating range, phase shift means connected across said sensing element to said input circuit and operable when said impedance is outside of said range to substantially shift the phase of said input signal and produce an output current of an intermediate phase, said phase detector providing an output signal of said opposite polarity in response to said output current of said intermediate phase, and condition control means activated in response to said output signal of said first polarity.

10. In a condition control system, the combination of, an amplifier stage having an input, an output and a common terminal for providing in an output circuit connected to the output and common terminals an alternating output current variable in phase and amplitude with corresponding changes of current flowing in an input circuit connected to the input and common terminals, a condition sensing element having an impedenace variable with changes in the value of a condition being controlled, a first alternating voltage source connected to said sensing element to provide a voltage there across variable with said impedance, a second alternating voltage source, said input circuit connecting in series said sensing element and said second alternating voltage source phased oppositely to said voltage provided across said sensing element for providing an alternating current input signal of a first phase and the opposite phase in response to variation of said impedance above and below a control value within a normal operating range, phase shift means connected across said sensing element to provide an alternating current input signal of a phase between said first and opposite phases when the apparent value of said impedance is beyond said range, means for regulating said condition, and output means controlling said regulating means in response to variations in the phase and amplitude of said output current and operable to activate the regulating means when said input signal is of said first phase and disable the regulating means when the input signal is of said intermediate and opposite phases.

References Cited in the file of this patent

UNITED STATES PATENTS

| | | |
|---|---|---|
| 2,729,396 | Impery et al. | Jan. 3, 1956 |
| 2,806,118 | Peterson | Sept. 10, 1957 |
| 2,810,055 | Packard | Oct. 15, 1957 |